(12) United States Patent
Sharma et al.

(10) Patent No.: US 11,681,608 B2
(45) Date of Patent: Jun. 20, 2023

(54) COMPLEX SYSTEM FOR DATA PIPELINE TEST AUTOMATION

(71) Applicant: Accenture Global Solutions Limited, Dublin (IE)

(72) Inventors: Astha Sharma, Bangalore (IN); Himanshu Kumar, Praygraj (IN); Anand Narasimhamurthy, Bangalore (IN); Anuj Kumar Mishra, Bangalore (IN); Pulkit Duggal, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 138 days.

(21) Appl. No.: 17/403,220

(22) Filed: Aug. 16, 2021

(65) Prior Publication Data

US 2022/0283933 A1 Sep. 8, 2022

(30) Foreign Application Priority Data

Mar. 5, 2021 (IN) .............................. 202141009274
Jun. 30, 2021 (IN) .............................. 202141029354

(51) Int. Cl.
*G06F 9/44* (2018.01)
*G06F 11/36* (2006.01)
*G06F 16/25* (2019.01)
*G06F 16/21* (2019.01)

(52) U.S. Cl.
CPC ...... *G06F 11/3688* (2013.01); *G06F 11/3684* (2013.01); *G06F 11/3692* (2013.01); *G06F 16/214* (2019.01); *G06F 16/254* (2019.01); *G06F 11/3664* (2013.01)

(58) Field of Classification Search
CPC ............ G06F 11/3688; G06F 11/3684; G06F 11/3692; G06F 11/3664; G06F 16/214; G06F 16/254
See application file for complete search history.

(56) References Cited

U.S. PATENT DOCUMENTS

2012/0265726 A1* 10/2012 Padmanabhan ....... G06F 16/214
707/602
2015/0134589 A1* 5/2015 Marrelli ................ G06F 16/254
707/602

OTHER PUBLICATIONS

Manjunath T.N. et al., Automated Data Validation for Data Migration Security, Sep. 2011, [Retrieved on Feb. 13, 2023], Retrieved from the internet: <URL: https://d1wqtxts1xzle7.cloudfront.net/32639017/pxc3875088-libre.pdf?> 6 Pages (41-46) (Year: 2011).*

(Continued)

*Primary Examiner* — Anibal Rivera
(74) *Attorney, Agent, or Firm* — Crowell & Moring LLP

(57) ABSTRACT

A system may execute a pipelined multiple-tier test stack to support migration of computing resources via a migratory data stream. Via the pipelined multiple-tier test stack, the system may perform extract, transform, and load operations on the migratory data stream. The extract, transform, and load operations may be used to identify applications that may undergo testing. At a generation tier of the pipelined multiple-tier test stack, the system may generate test scripts, which may be used to test the application. The tests may be validated by the system via a validation tier of the pipelined multiple-tier test stack. To govern the operations, the pipelined multiple-tier test stack may rely on a multi-point reference data model.

20 Claims, 13 Drawing Sheets

(56) References Cited

OTHER PUBLICATIONS

Madhu Dande, The Data Migration Testing Approach, Nov. 2015, [Retrieved on Feb. 13, 2023], Retrieved from the internet: <URL: https://d1wqtxts1xzle7.cloudfront.net/50035246/Madhu_Dande_-_V3I11-0016-libre.pdf?> 9 Pages (64-72) (Year: 2015).*

Best of ETL Testing Tools, ETL Validator downloaded from the internet: https://www.datagaps.com/etl-testing-tools/etl-validator/, 14 pages.

Data Test Automation, Test Automation for BI, DWH and all other data driven development, downloaded from the internet: https://bigeval.com/platform/dta-software/, 15 pages.

Bitwise, Qualidi ETL Testing Tool, downloaded from the internet: https://www.bitwiseglobal.com/products/qualidi, 20 pages.

ETL & Data Warehouse Testing Software, Test in Dev & Monitor in Production, iCEDQ, Torana Inc., downloaded from the internet: https://icedg.com/overview, 9 pages.

"Informatica Data Validation Option User Guide" downloaded from https://docs.informatica.com/data-integration/powercenter/10-5/data-validation-option-user-guide/introduction-to-data-validation-option.html, 241 pages.

Right Data, Platform for Data Reliability and Trust, downloaded from the internet: https://www.getrightdata.com/RDt-product 7 pages.

QuerySurge, What is Query Surge? Downloaded from the internet: https://www.querysurge.com/product-tour/what-is-querysurge, 14 pages.

* cited by examiner

COMPLEX SYSTEM FOR DATA PIPELINE TEST AUTOMATION

PRIORITY

This application claims priority to Indian Patent Application No. 202141009274 filed Mar. 5, 2021, titled Complex System for Data Pipeline Test Automation, and to Indian Patent Application No. 202141029354 filed Jun. 30, 2021, titled Complex System for Data Pipeline Test Automation, which are incorporated by reference in their entirety.

TECHNICAL FIELD

This disclosure relates to a complex system for data pipeline test automation.

BACKGROUND

The processing power, memory capacity, available disk space, and other resources available to computer systems have increased exponentially in recent years. Diverse computer systems are deployed worldwide in great numbers to host an immense number of data platforms running extremely diverse applications. Improvements in moving applications between systems and deployment environments will further advance the capabilities of these computer systems.

DETAILED DESCRIPTION

In various scenarios, a cloud computing system (or other computing system) may undergo the technical process of migration from one computing platform to another computing platform. A data pipeline may be used to stream data (e.g., as a migratory stream) from the source platform to the target platform using extract, transform, and load (ETL) operations. In various cases, consistent operation before and after (and/or improved operation after) migration may be dependent on validation of numerous computational components and/or massive quantities of data. In some cases, logic governing such operations may be complex. The complexity may present challenges in maintaining consistent forward operation where the data pipeline operates to migrate the computing system. The complexity may present challenges in reverse-referencing (e.g., back tracing) to identify an origin for an error when inconsistency is encountered.

In various implementations, a multi-point reference data model and/or multi-point reference placement model may be used to implement flexible and consistent forward operation. In some cases, this multi-point reference data/placement model may support initiating forward operation from any of various points in the streaming process. In various implementations, the multi-point reference data model may be used to support reverse-referencing to back-trace inconsistent operation (and/or validate virtually any type of operation). Dual support for forward-referencing and reverse-referencing at multiple operation points provides an improvement in the operation of hardware-based migration systems in the form of increased reliability in operation and faster (and more efficient) error tracing (e.g., through improved back tracing) when inconsistent operation is identified. Thus, the multi-point reference data model provides technological improvements over existing market solutions.

Figure 1:
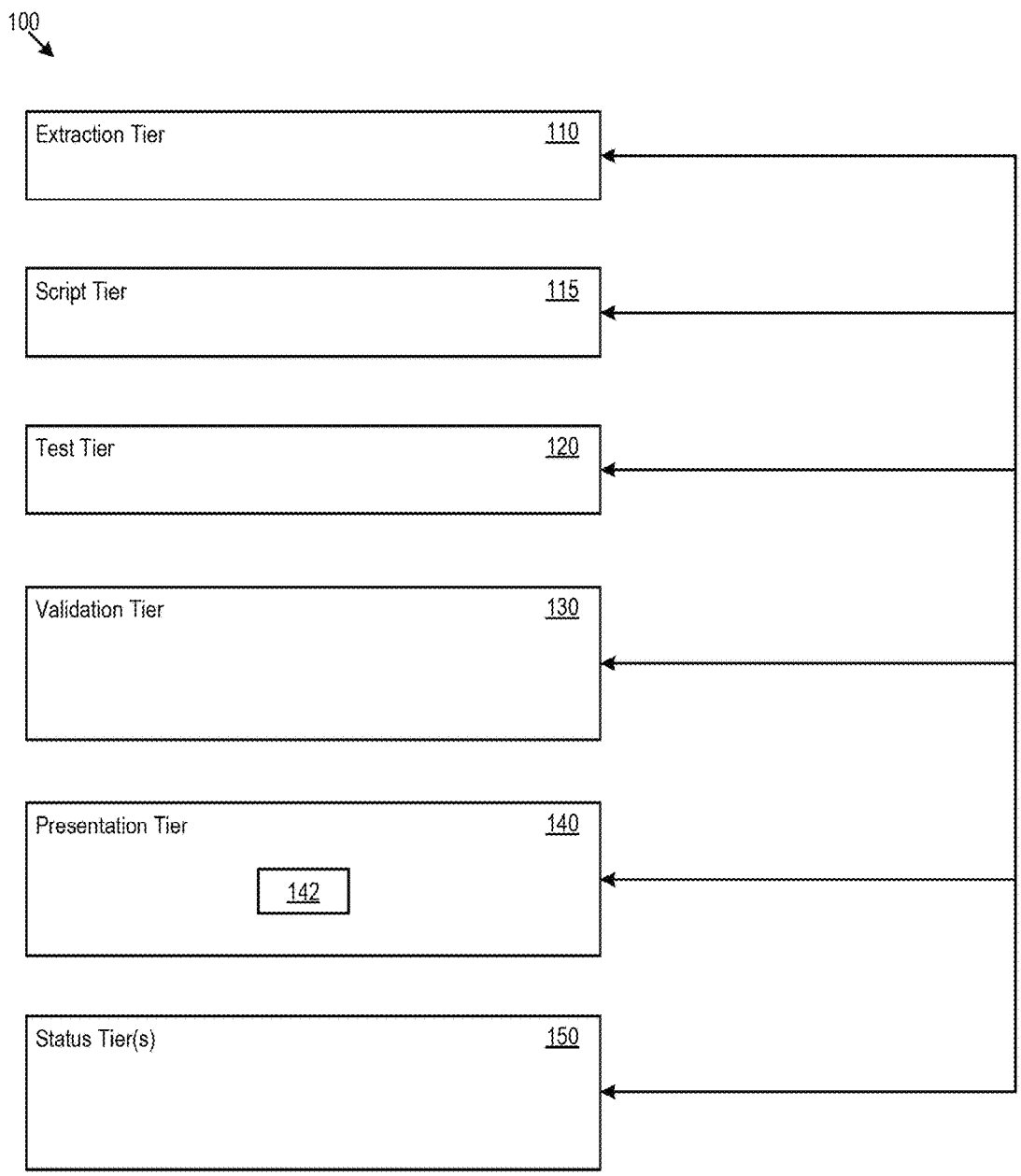
FIG. 1 shows an example pipelined multiple-tier test stack.

FIG. 1 shows a pipelined multiple-tier test stack 100 that may be implemented on migration circuitry. The operation of the migration circuitry may be governed by data validation logic and job validation logic, either of which may be subject to performance validation testing on the test stack 100. The migration circuitry may carry out the operations of the pipelined multiple-tier test stack 100. The pipelined multiple-tier test stack 100 may include an extraction tier 110, which may handle a migratory data stream and or job detail manifest reception (e.g., extraction, transformation, and/or loading of data and/or job details); a script tier 115, which may handle generation of test scripts (e.g., which may be based on enterprise rules); a test tier 120 which may handle test execution; a validation tier 130, which may handle data-agnostic and/or job-agnostic validation of the data tests and/or operation-agnostic of the workflow tests; a presentation tier 140 which may handle presentation of outputs, parameters, options, controls or other interface elements to interfaces for operators and/or control systems (in some implementations the presentation tier may support one or more application programing interfaces (APIs) for integration with various client systems); various status check tiers 150 which may be interspersed among the other tiers to check the status of the system at various stages of operation. Operations at the various tiers may be triggered via operations at other tiers to support cascaded pipelined operation.

A stack may refer to a multi-tiered (or multi-layered) computer architecture that defines the interaction of software and hardware resources at the multiple layers. The Open Systems Interconnection (OSI) model is an example of a stack-type architecture. The tiers (e.g., layers) of a stack may pass data and hardware resources among themselves to facilitate data processing.

Figure 2:
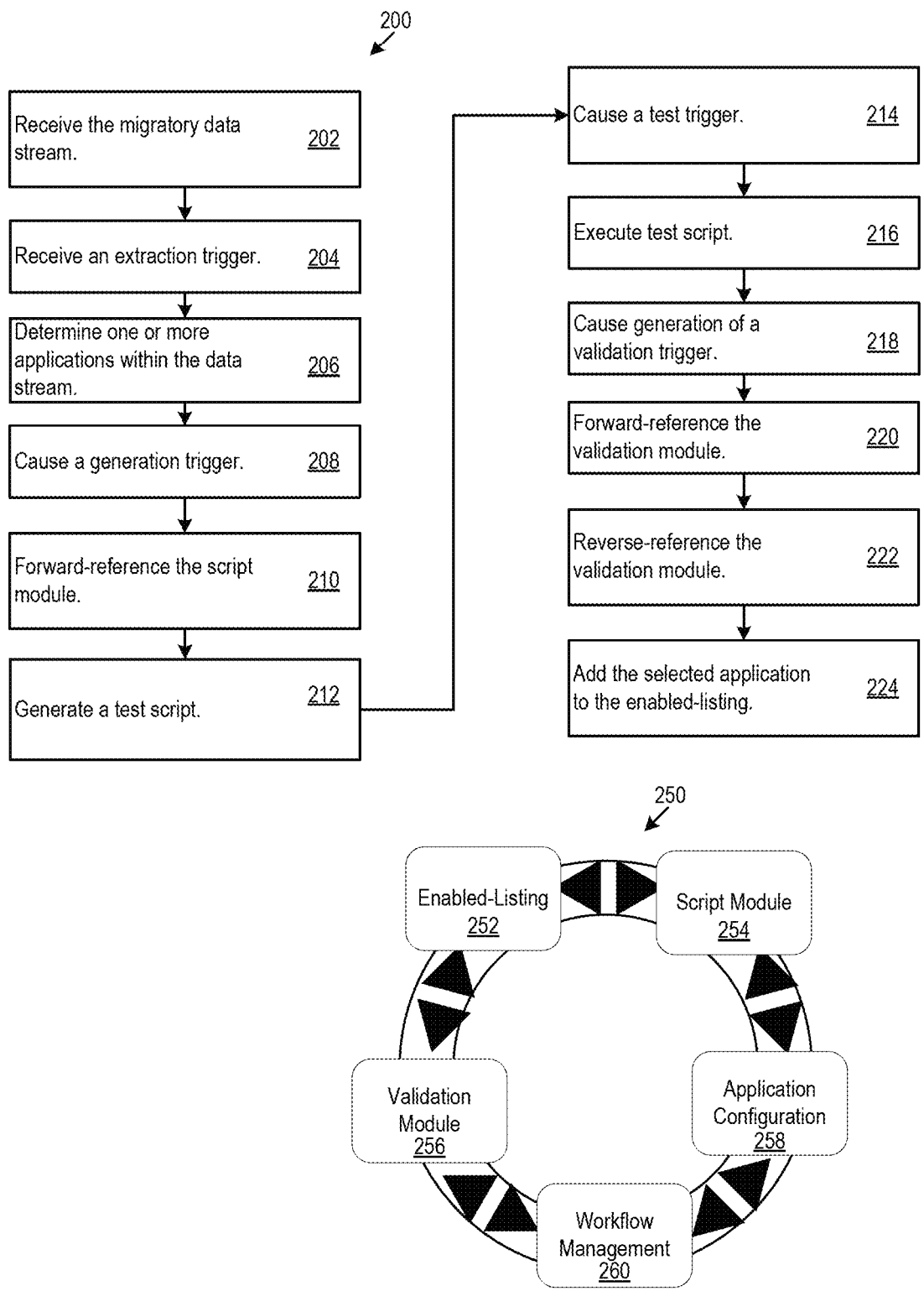
FIG. 2 shows example data validation logic.

Referring now to FIG. 2, example data validation logic (DVL) 200, which may be executed by the test stack 100, is shown. The DVL 200 may receive a migratory data stream (202). The migratory data stream may include a data stream to support migration of one or more computing resources, such as that to support a migration between cloud providers and/or computing environments.

The DVL 200 may receive an extraction trigger indicating reception of the migratory data stream (204). For example upon receiving the data stream, the DVL 200 may generate (to support cascaded execution) an extraction trigger to indicate that extraction should begin. In some cases, the extraction trigger may be manually provided through a control interface. The DVL 200 may then pass the extraction trigger to the extraction tier to initiate extraction-transform-load (ETL) operations on the data in response to the extraction trigger.

Via the ETL operations, the DVL 200 may determine one or more applications in the migratory data stream (206). The DVL 200 may reverse-reference an enabled-listing 252 of a multi-point reference data model 250 to determine whether the selected application is present. When the selected application is present on the enabled-listing 252, the DVL 200 may continue on to other applications within the data stream. When the selected application is not present on the enabled-listing 252, the DVL 200 may cause (initiate generation of) a generation trigger responsive to the selected application (208).

The multi-point reference data model 250 may include an enabled-listing 252 of validated applications. The multi-point reference data model 250 may further include a script module 254 to support generation of test scripts. The validation module 256 may track validation requirements. The multi-point reference data model 250 may further include application configuration data in an application configuration module 258. The interaction of the modules may be governed by a workflow management module 260 which may operate as a portion of the DVL 200. In some implementations, workflow platforms such as Airflow or Google Cloud Platform may be used implement workflow management.

The DVL 200 may pass the generation trigger to a script tier 115 of the test stack. Responsive to the generation trigger and at the script tier, the DVL 200 may forward-reference the script module 254 of the multi-point reference data model 250 to identify a test condition for the selected application (210). The test condition may include one or more factors (e.g., data structure requirements, data handling requirements, data form requirements, or other requirements) which the DVL 200 may test (and then validate) before marking the selected application as enabled. The DVL 200 may generate a test script for the selected application responsive to the test condition (212). The test script may include instructions for testing the relevant factors. Upon generating the test script, the DVL 200 may cause a test trigger to initiate operation of the test tier (214).

At the test tier 120, the DVL 200 may execute the test script and generate a return with a specific data-type (216). For example, the test script may perform the selected application on data (e.g., enterprise data, dummy data, or other data) to generate the return. The specific data-type may result from the execution of the selected application and/or the data-type of the data that was input into the selected application. In some cases, to continue cascaded operation, the DVL 200 may cause generation of a validation trigger to initiate operation of the validation tier (218).

At the validation tier 130, the DVL 200 may forward-reference the validation module 256 of the multi-point reference data model 250 to identify a data-agnostic validation-grouping including the specific data-type (220). The data-agnostic validation-grouping may include a set of data-types that may be validated using a data-agnostic validation common to the members of the data-agnostic validation-grouping. For example, the data-agnostic validation-grouping may include a comparison of a form of the data (e.g., the presence/non-presence of changes, columns, or other forms) with a template. Membership within the data-agnostic validation-grouping may indicate that one or more data-agnostic validations may be used on the data.

In various implementations, data-agnostic validations may include presence analyses that determine validity based on the presence of particular data in the result. In various implementations, data-agnostic validations may include absence analyses that determine validity based on the absence of particular data in the result. In various implementations, data-agnostic validations may include fetch analyses that determine validity based on whether a data fetch operation occurred. In various implementations, data-agnostic validations may include dimension change analyses that determine validity based on slowly changing dimension analyses. Data-agnostic validation-groupings may be selected based on the relevance of the particular data-agnostic validation to the specific data-type of the result of the application being tested.

Responsive to the validation trigger, the DVL 200 may reverse reference the validation module 256 of the multi-point reference data model 250 to determine whether the validation condition indicated a success for the data-agnostic validation (222). When the validation condition does not indicate a success, the DVL 200 may forgo addition of the selected application to the enabled-listing 252 of the multi-point reference data model. Additionally or alternatively, the DVL 200 may generate an error message indicating the failure for the selected application (e.g., for display at a control interface generated at the presentation tier, as discussed below). Responsive to a successful validation, the DVL 200 may add the selected application to the enabled-listing 252 of the multi-point reference data model (224). Additionally or alternatively, the DVL 200 may generate a success message indicating the success for the selected application (e.g., for display at a control interface generated at the presentation tier, as discussed below).

The DVL 200 may further implement operations at a status check tier 150, which may request status information (e.g., success/failure information, throughput information, performance data, progress data, and/or other status information) from the other tiers.

In some implementations, the DVL 200 may implement a control interface 142 at the presentation tier 140. The control interface may be used to receive operator instructions and/or feedback responsive to the status information. Further, the control interface 142 may display error messages and/or success messages in response to validations. In some cases, the control interface 142 may be dynamically rendered to allow for context specific displays of options and information for operator overseeing a computing resource migration.

Figure 3:
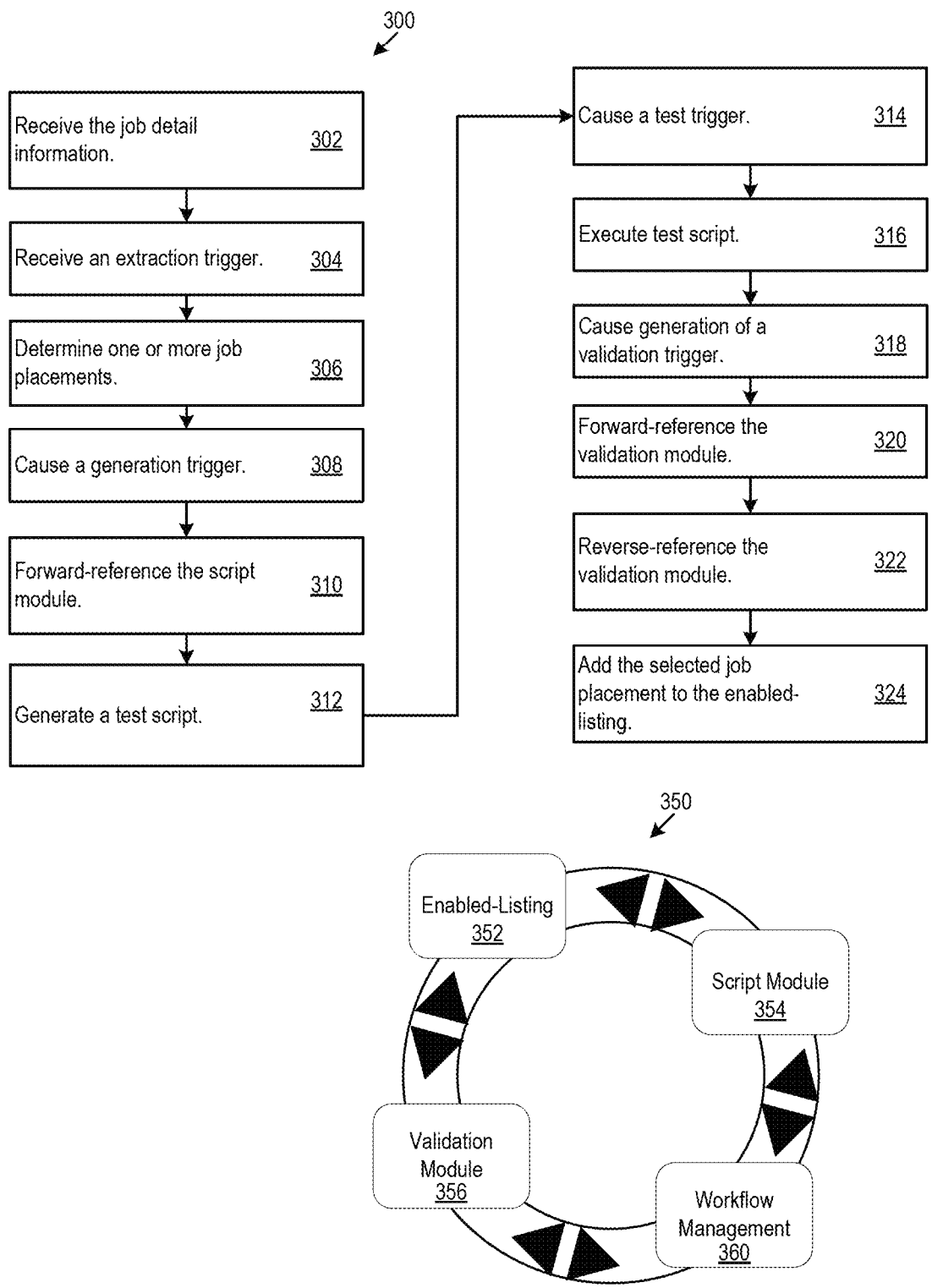
FIG. 3 shows example job validation logic.

Referring now to FIG. 3, example job validation logic (JVL) 300, which may be executed by the test stack 100, is shown. The JVL 300 may receive a job detail manifest (302). The job detail manifest may include job details to support orchestration of a migration of one or more computing resources, such as that to support a migration between cloud providers and/or computing environments.

The JVL 300 may receive an extraction trigger indicating reception of the job detail manifest (304). For example upon receiving the job detail manifest, the JVL 300 may generate (to support cascaded execution) an extraction trigger to indicate that extraction operations job detail manifest should begin. The JVL 300 may then pass the extraction trigger to the extraction tier to initiate extraction-transform-load (ETL) operations, e.g., such as metadata extraction, schedule extraction, execution log extraction, and/or other extractions, on the job detail manifest in response to the extraction trigger.

Via the ETL operations, the JVL 300 may determine one or more job placements in the job detail manifest (306). For example, the JVL 300 may determine when, how often, at what speed, with what resources, and/or under what other conditions a selected migration job may be performed. The JVL 300 may reverse-reference an enabled-listing 352 of a multi-point reference placement model 350 to determine whether the selected job placement is present. When the selected job placement is present on the enabled-listing, the JVL 300 may continue on to other job placements within the manifest. When the selected job placement is not present on the enabled-listing, the JVL 300 may cause (initiate generation of) a generation trigger responsive to the selected job placement (308).

The multi-point reference placement model 350 may include an enabled-listing 352 of validated placements. The multi-point reference placement model 350 may further include a script module 354 to support generation of test scripts. The validation module 356 may track validation requirements. The interaction of the modules may be governed by a workflow management module 360 which may operate as a portion of the JVL 300.

The JVL 300 may pass the generation trigger to a script tier 115 of the test stack. Responsive to the generation trigger and at the script tier, the JVL 300 may forward-reference a script module 354 of the multi-point reference placement model 350 to identify a test condition for the selected job placement (310). The test condition may include one or more factors (e.g., timing requirements, performance requirements, data form requirements, or other requirements) which the JVL 300 may test (and then validate) before marking the selected application as enabled. The JVL 300 may generate a test script for the selected job placement responsive to the test condition (312). The test script may include instructions for testing the relevant factors. Upon generating the test script, the JVL 300 may cause a test trigger to initiate operation of the test tier (314).

At the test tier 120, the JVL 300 may execute the test script and generate a return with a specific job placement (316). For example, the test script may place the job within a specific execution context (e.g., schedule, number of run times, specific assignment of execution resources, and/or other context) to generate the return. In some cases, to continue cascaded operation, the JVL 300 may cause generation of a validation trigger to initiate operation of the validation tier (318).

At the validation tier 130, the JVL 300 may forward-reference the validation module 356 of the multi-point reference placement model 350 to identify a job-agnostic validation-grouping including the specific job placement (320). The job-agnostic validation-grouping may include a set of job placements (e.g., execution contexts) that may be validated using a job-agnostic validation common to the members of the job-agnostic validation-grouping. For example, the job-agnostic validation-grouping may include a comparison of a scheduling of the job (e.g., when a job is executed, the order in which a job is executed, the frequency at which the job is executed, and/or other scheduling factors) with a template. Membership within the job-agnostic validation-grouping may indicate that one or more job-agnostic validations may be used on the specific job placement.

Job-agnosticism may be a feature of tests that may be applied to jobs and/or job placements that are independent of details specific to individual jobs or job placements. In other words, job-agnostic validations provide the flexibility of allowing reuse on a variety of different jobs in a variety of different execution contexts.

In various implementations, job-agnostic validations may include comparing a scheduled number of run times with an expected number of run times. In various implementations, job-agnostic validations may include comparing identifiers for one or more scheduled runs. For example, the comparison may include presence or absence comparison (e.g., versus a template) for the identifiers. In various implementations, job-agnostic validations may include a performance validation based on one or more performance metrics (e.g., throughput metrics, processing speed metrics, memory utilization, and/or other metrics).

Responsive to the validation trigger, the JVL 300 may reverse reference the validation module 356 of the multi-point reference placement model 350 to determine whether the validation condition indicated a success for the job-agnostic validation (322). When the validation condition does not indicate a success, the JVL 300 may forgo addition of the selected job placement to the enabled-listing of the multi-point reference placement model. Additionally or alternatively, the JVL 300 may generate an error message indicating the failure for the selected job placement (e.g., for display at a control interface generated at the presentation tier 140, as discussed below). Responsive to a successful validation, the JVL 300 may add the selected job placement to the enabled-listing 352 of the multi-point reference placement model (324). Additionally or alternatively, the JVL 300 may generate a success message indicating the success for the selected job placement (e.g., for display at a control interface generated at the presentation tier 140, as discussed below).

The JVL 300 may further implement operations at a status check tier 150, which may request status information (e.g., success/failure information, throughput information, performance data, progress data, and/or other status information) from the other tiers.

In some implementations, the JVL 300 may implement a control interface 142 at the presentation tier 140. The control interface may be used to receive operator instructions and/or feedback responsive to the status information. Further, the control interface 142 may display error messages and/or success messages in response to validations.

Figure 4:
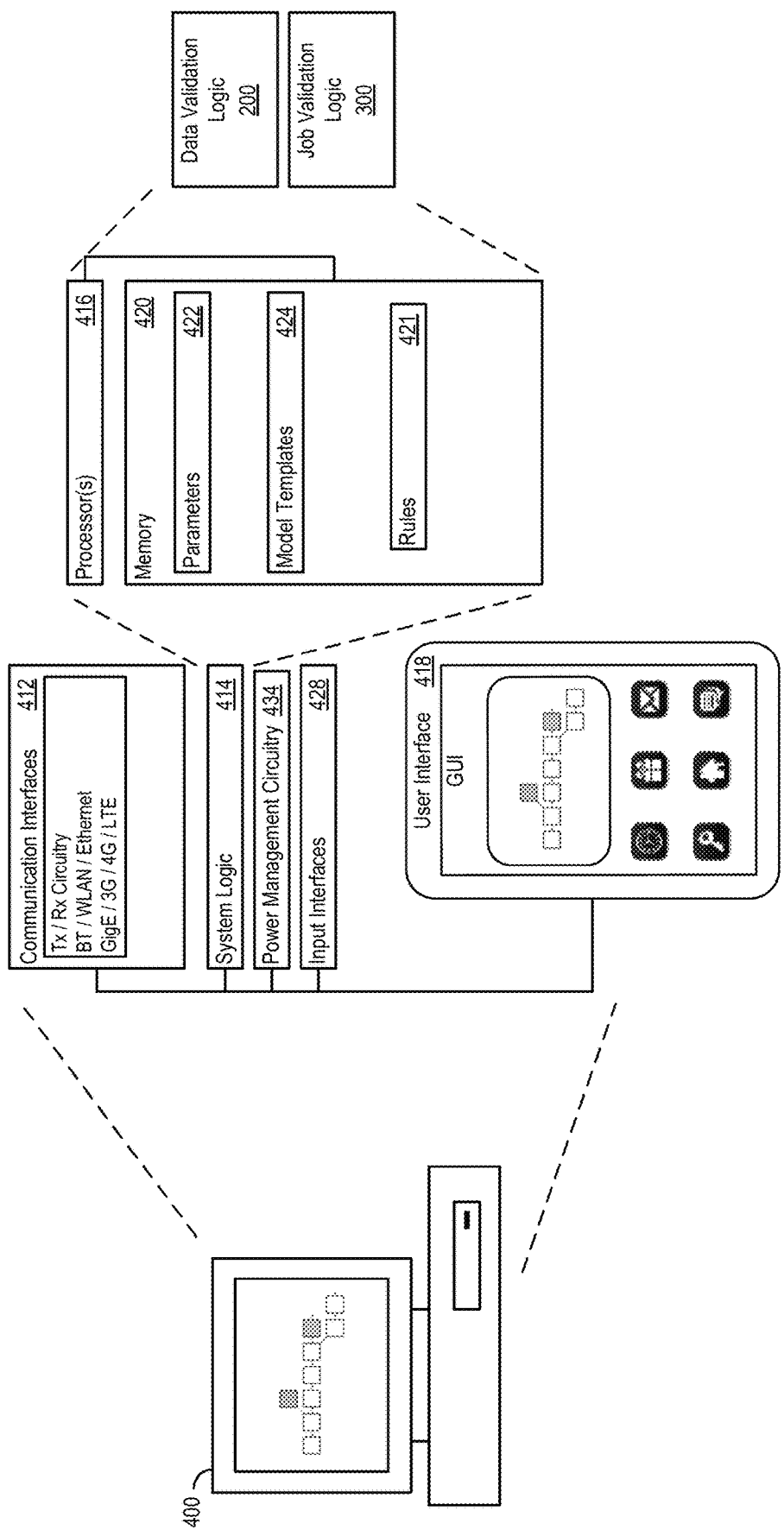
FIG. 4 shows an example execution environment for implementing the pipelined multiple-tier test stack.

FIG. 4 shows an example execution environment (EE) 400 for implementing the pipelined multiple-tier test stack. The EE 400 may include system logic 414 to support data migration and/or job placement. The system logic 414 may include processors 416, memory 420, and/or other circuitry, which may be used to implement the example DVL 200 and/or the example JVL 300, which may provide software support to implement the various tasks performed by the pipelined multiple-tier test stack 100. Thus, in some cases, the system logic 414 may act as the migration circuitry.

The memory 420 may be used to store parameters 422 and/or model templates 424 used in the pipelined multiple-tier test stack. The memory 420 may further store rules 421 that may facilitate model management and/or the execution of other tasks.

The memory 420 may further include applications and structures, for example, coded objects, templates, or one or more other data structures to facilitate model management, pipelined multiple-tier test stack operation, and/or the execution of other tasks. The EE 400 may also include one or more communication interfaces 412, which may support wireless, e.g. Bluetooth, Wi-Fi, WLAN, cellular (3G, 4G, LTE/A), and/or wired, ethernet, Gigabit ethernet, optical networking protocols. The communication interface 412 may support communication, e.g., through the communication tier as network interface circuitry, with data sources or resources used to facilitate model management, pipelined multiple-tier test stack operation, and/or the execution of other tasks. Additionally or alternatively, the communication interface 412 may support secure information exchanges, such as secure socket layer (SSL) or public-key encryption-based protocols for sending and receiving private data. The EE 400 may include power management circuitry 434 and one or more input interfaces 428.

The EE 400 may also include a user interface 418 that may include man-machine interfaces and/or graphical user interfaces (GUI). The GUI may be used to present interfaces, such as those generated at the presentation tier 140, and/or options to facilitate model management, pipelined multiple-tier test stack 100 operation, and/or the execution of other tasks.

Example Implementations

Various implementations have been specifically described. However, many other implementations are also possible. For example, the example implementations included below are described to be illustrative of various ones of the principles discussed above. However, the examples included below are not intended to be limiting, but rather, in some cases, specific examples to aid in the illustration of the above described techniques and architectures. The features of the following example implementations may be combined in various groupings in accord with the techniques and architectures describe above.

Figure 5:
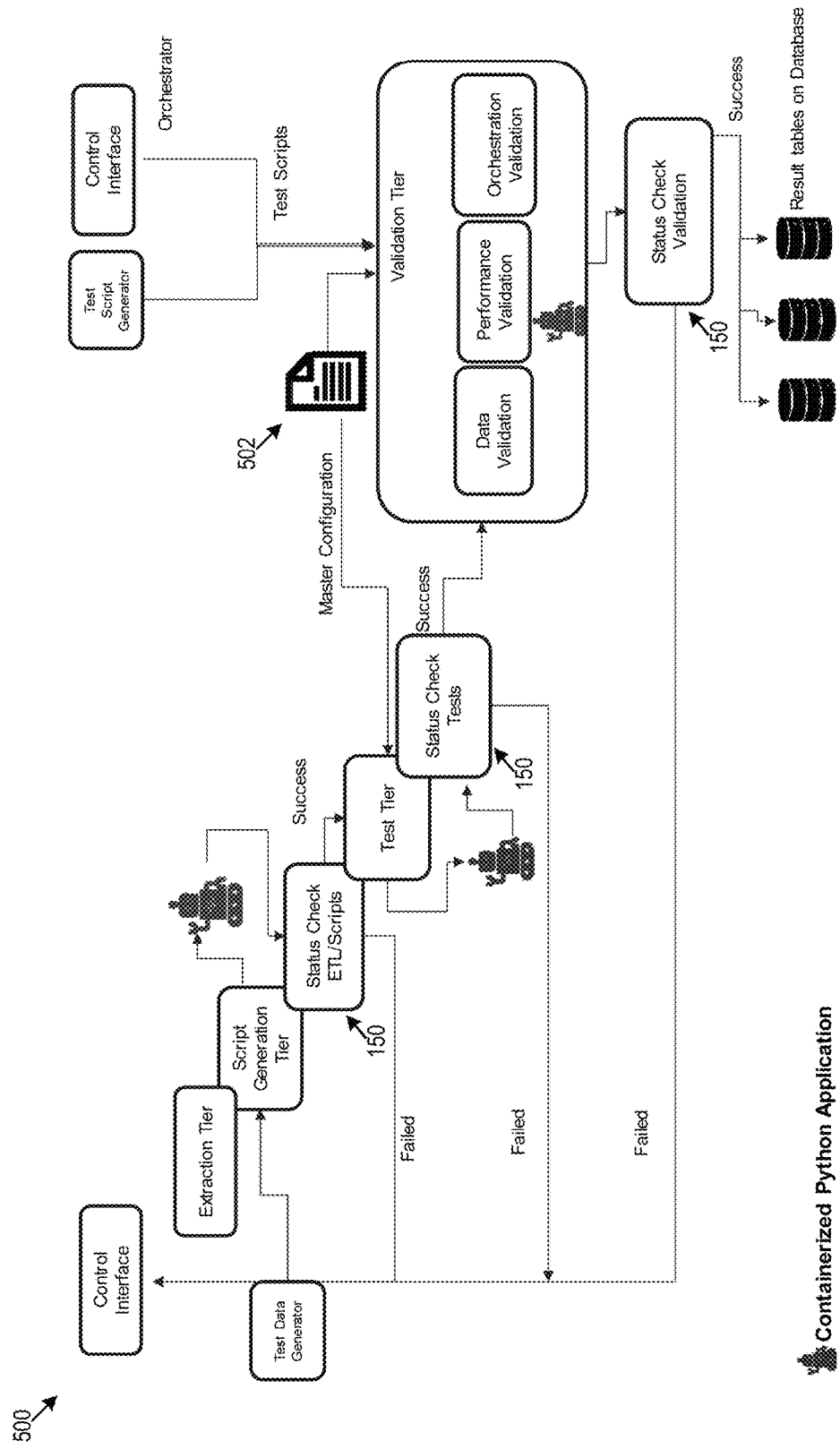
FIG. 5 shows example cascaded operation of the test stack.

FIG. 5 shows show example cascaded operation 500 of the test stack 100. Various tiers may generate triggers that initiate execution of later tiers. Status check tiers 150 may be interspersed among operation of the other tiers. In various implementations, a master configuration file 502 may serve as the basis for generating the multi-point reference data model and multi-point reference placement model for operation of the test stack 100. Accordingly, the master configuration file 502 may be invoked to execute either job testing and/or data testing. Additionally or alternatively, the master configuration file 502 may provide details to support performance validation.

Figure 6:
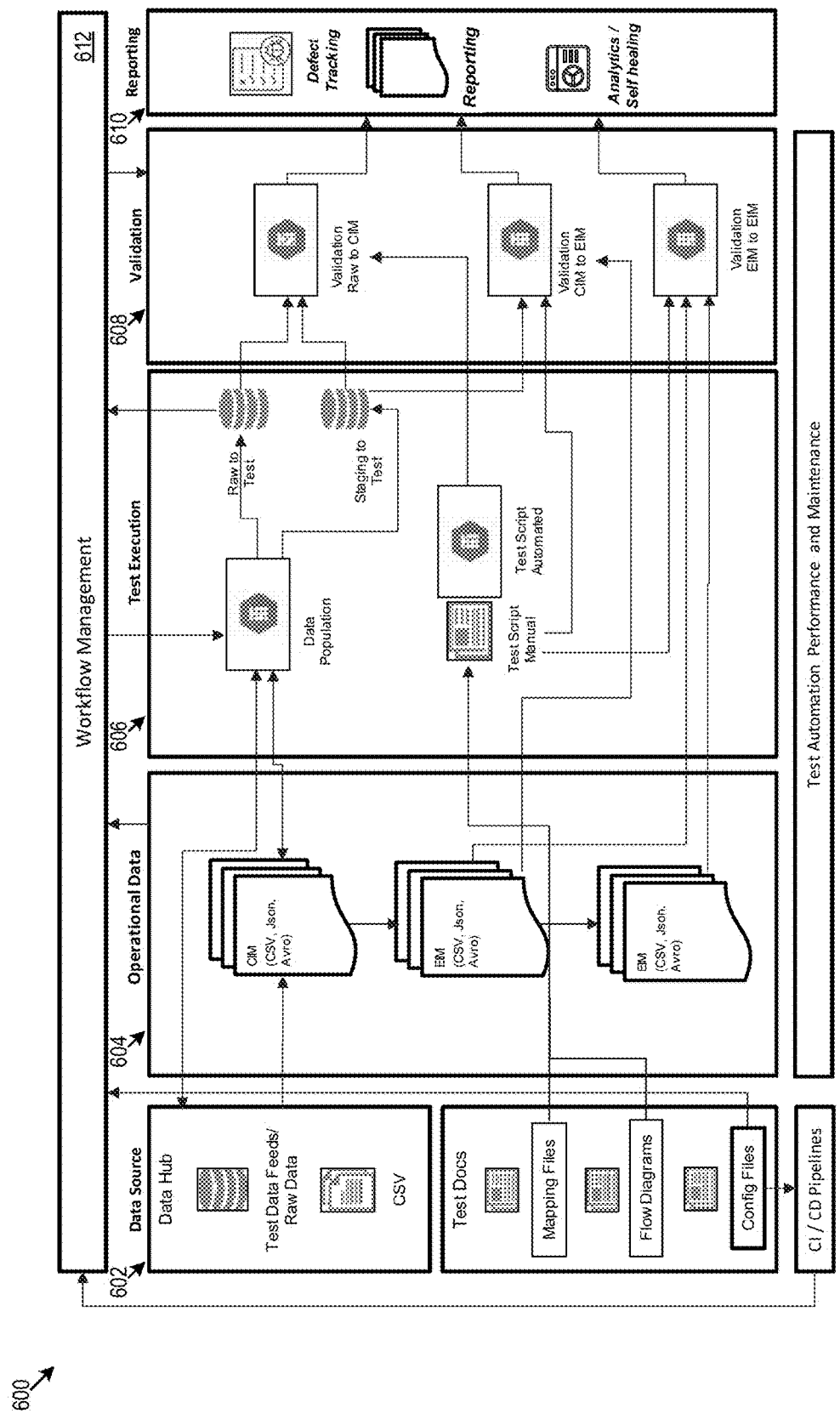
FIG. 6 shows an example operational flow.

FIG. 6 shows an example operational flow 600 that may be used to coordinate operation of the DVL 200. The migration data is obtained from the data sources 602. The migration data is processed used operational data 604, e.g., from a master configuration file. Tests based on the operational data are then executed 606 and then validated 608. The control interface is then used to report 610 results from the validations and tests. Workflow management 612 (e.g., as part of the DVL 200 and/or JVL 300 may coordinate the operations).

Figure 7:
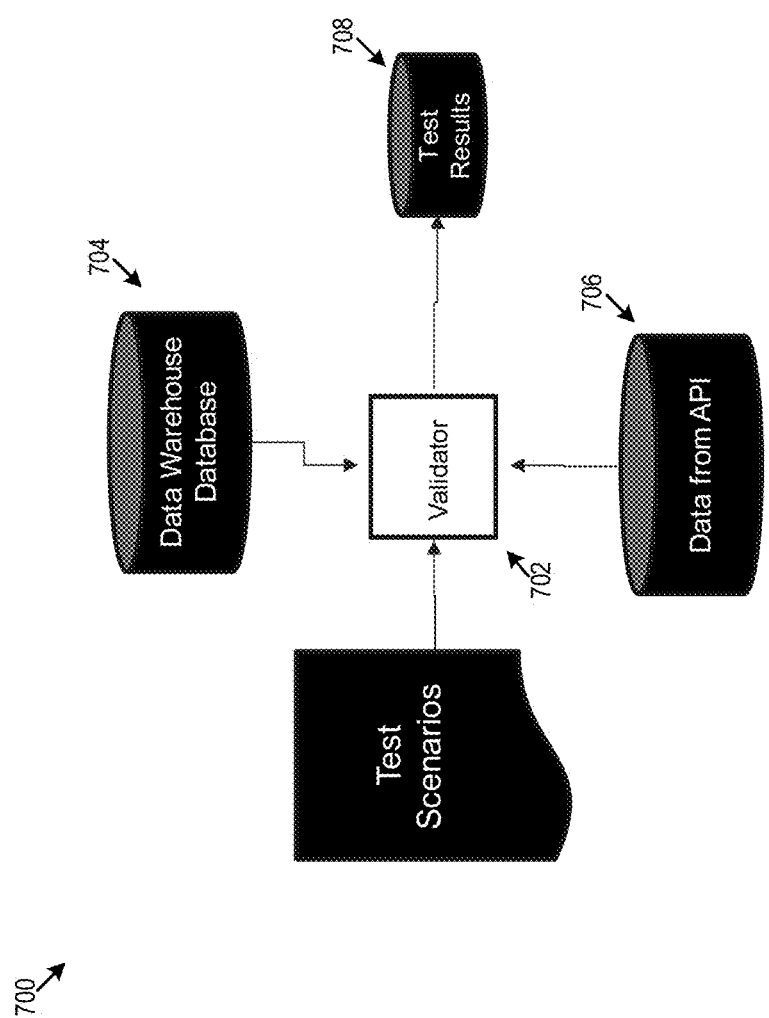
FIG. 7 shows an example data-agnostic validation platform.

FIG. 7 shows an example data-agnostic validation platform 700. The validation tier 702 obtains (e.g., via action at other tiers) data from sources data warehouses 704 and/or Data APIs (application programming interfaces) 706. The validation tier 702 obtains test scenarios (e.g., from the master configuration file or other configuration sources) to produce the validated results 708.

Figure 8:
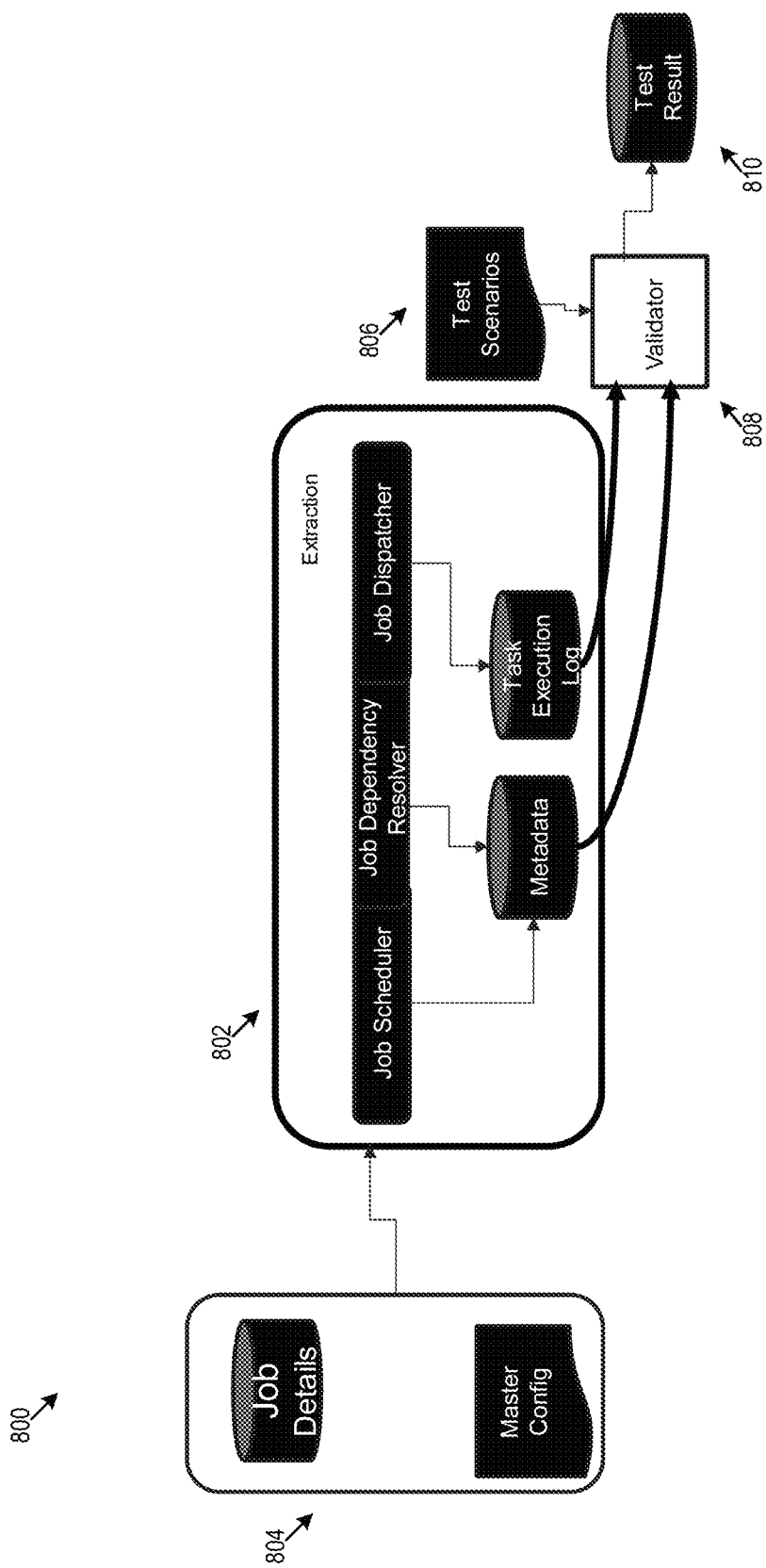
FIG. 8 shows an example job-agnostic validation platform.

FIG. 8 shows an example job-agnostic validation platform 800. The extraction tier 802 obtains \ job details and configuration data 804 (e.g., from the master configuration file to determine job placements). The test tier 806 provide execution results for validation at the validation tier 808, which output the validated results 810.

Figure 9:
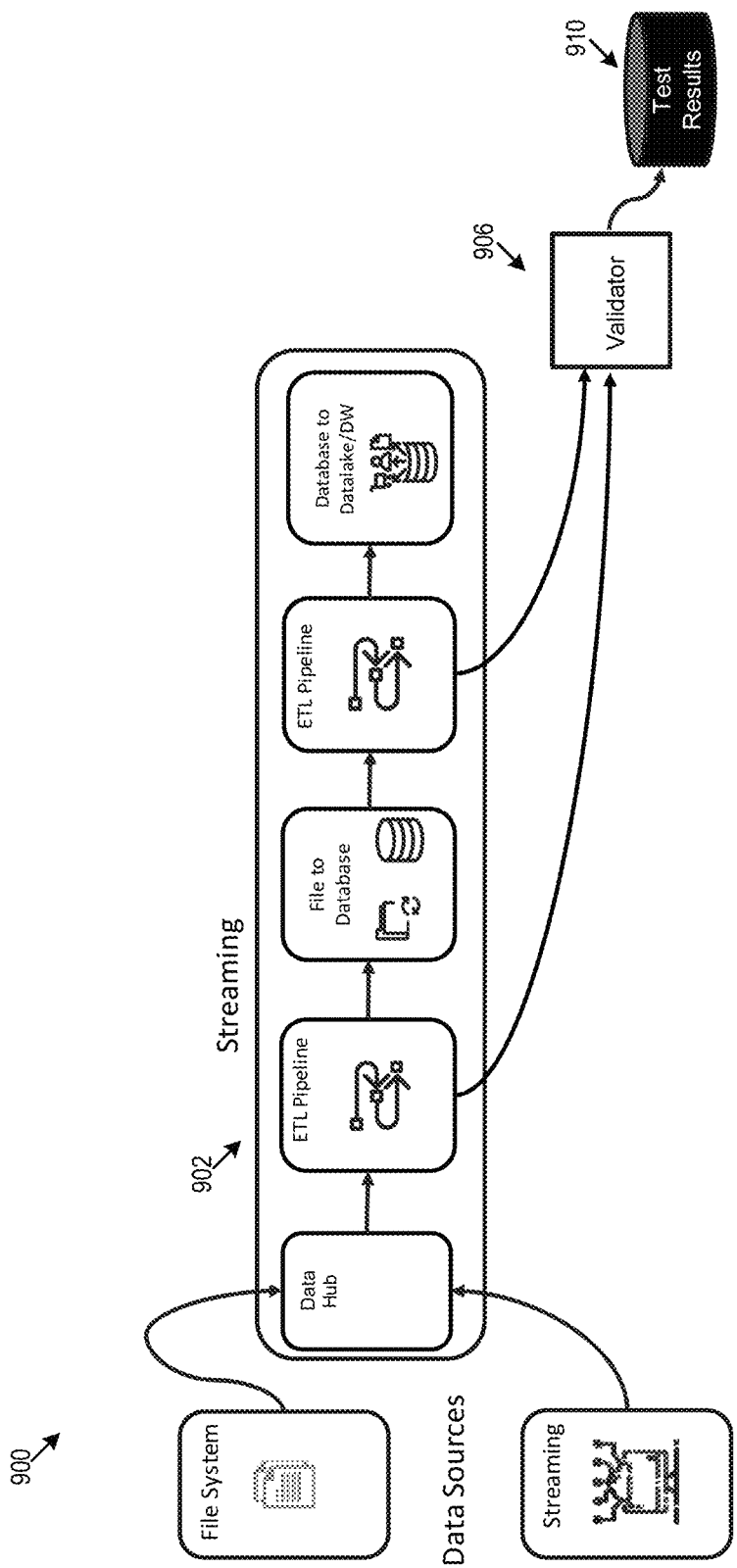
FIG. 9 shows an example performance validation platform.

FIG. 9 shows an example performance validation platform 900. The platform may use a streaming system 902. The simulated stream may be monitored by the validation tier 906 to produce validated performance results 910 related to data operations and/or job placement.

Figure 10:
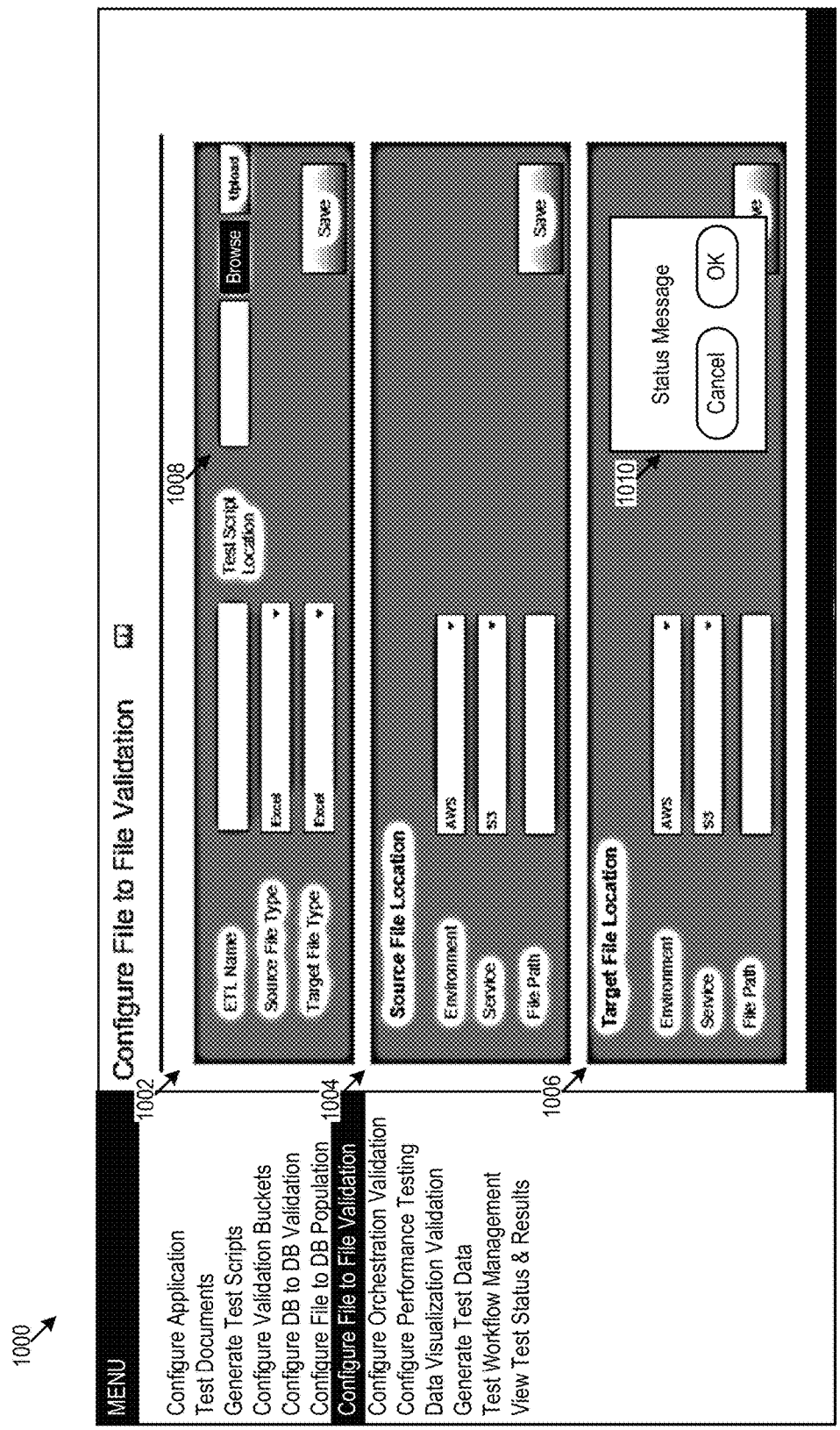
FIG. 10 shows an example control interface for data validation.

FIG. 10 shows an example control interface 1000 for data validation. The example control interface 1000 interface includes control windows of selection of the migratory data stream (e.g., ETL Name) 1002, identification of the source files 1004 for the migratory data stream, and the target file location 1006 where the files will migrated. The example control interface 1000 may include a field for indication of the test script 1008. In some cases, a dialogue box 1010 may be used to present updates to status information such as errors or success indications.

Figure 11:
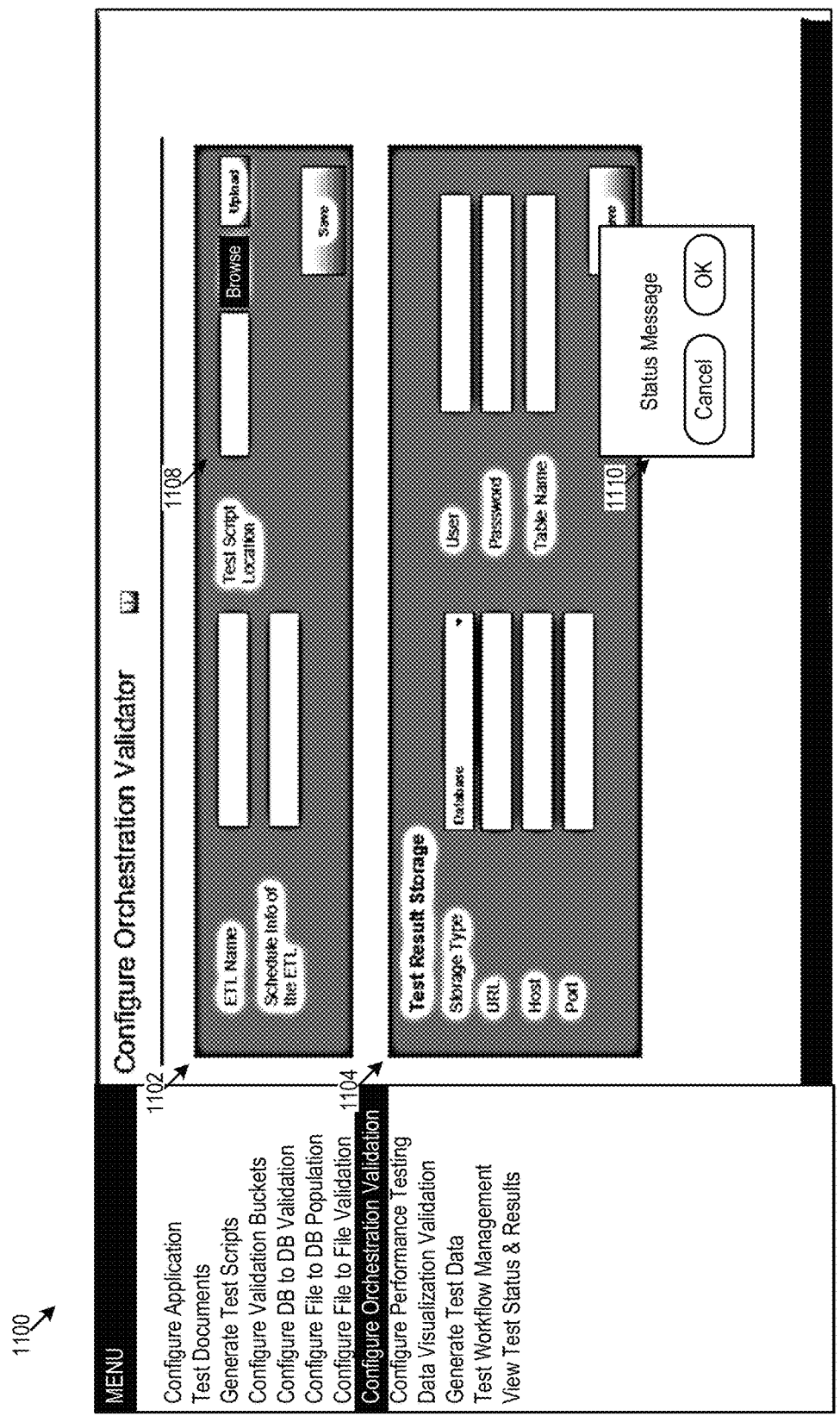
FIG. 11 shows an example control interface for orchestration validation.

FIG. 11 shows an example control interface 1100 for orchestration validation. The example control interface 1100 interface includes control windows of selection of the job detail information (e.g., ETL Name) 1102 and the test result storage location 1104. The example control interface 1100 may include a field for indication of the test script 1108. In some cases, a dialogue box 1110 may be used to present updates to status information such as errors or success indications.

Figure 12:
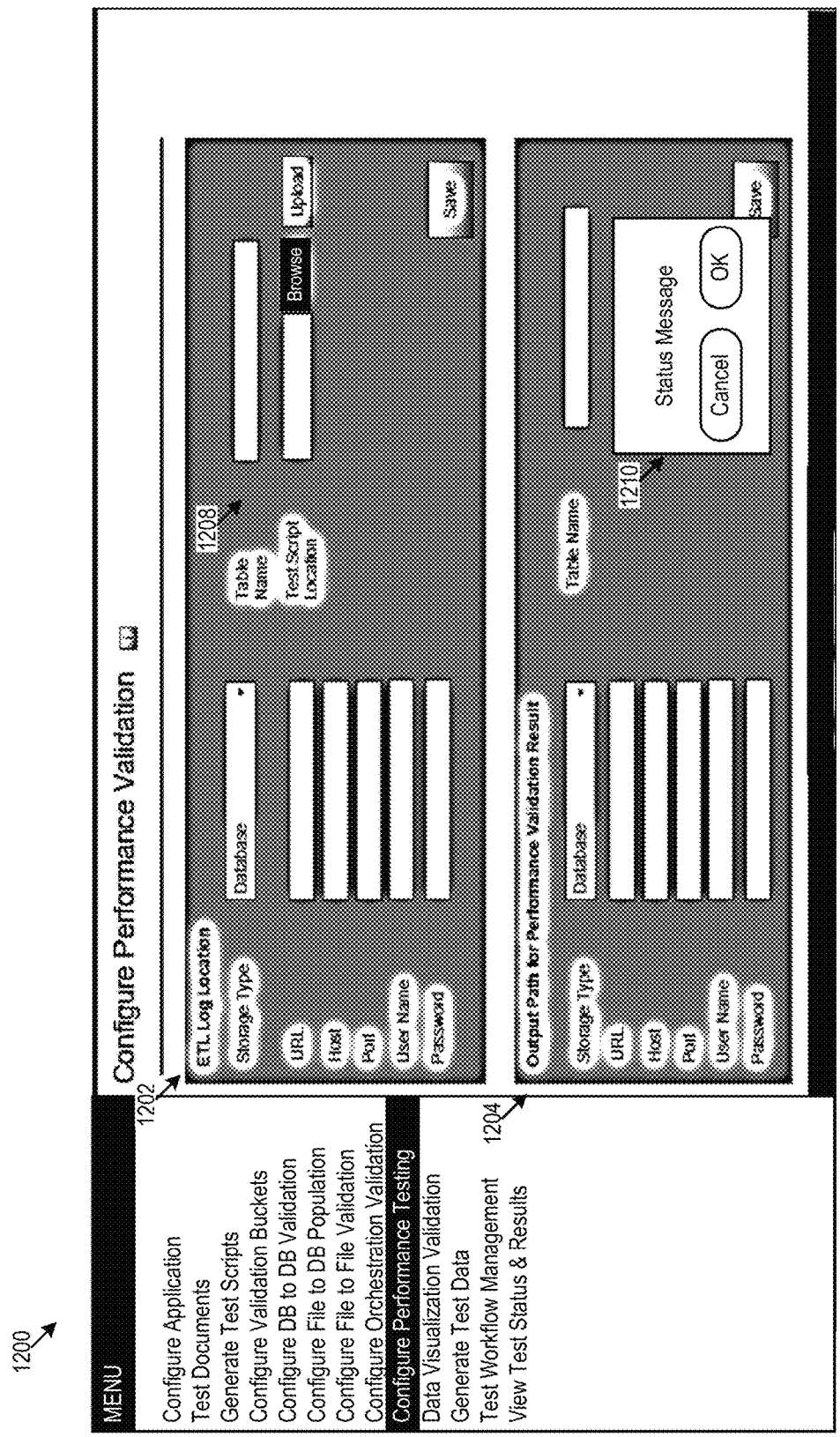
FIG. 12 shows an example control interface for performance validation.

FIG. 12 shows an example control interface 1200 for orchestration validation. The example control interface 1200 interface includes control windows of selection of the migratory data file/job detail information (e.g., ETL Name) 1202 and the test result storage location 1204. The example control interface 1200 may include a field for indication of the test script 1208. In some cases, a dialogue box 1210 may be used to present updates to status information such as errors or success indications.

Figure 13:
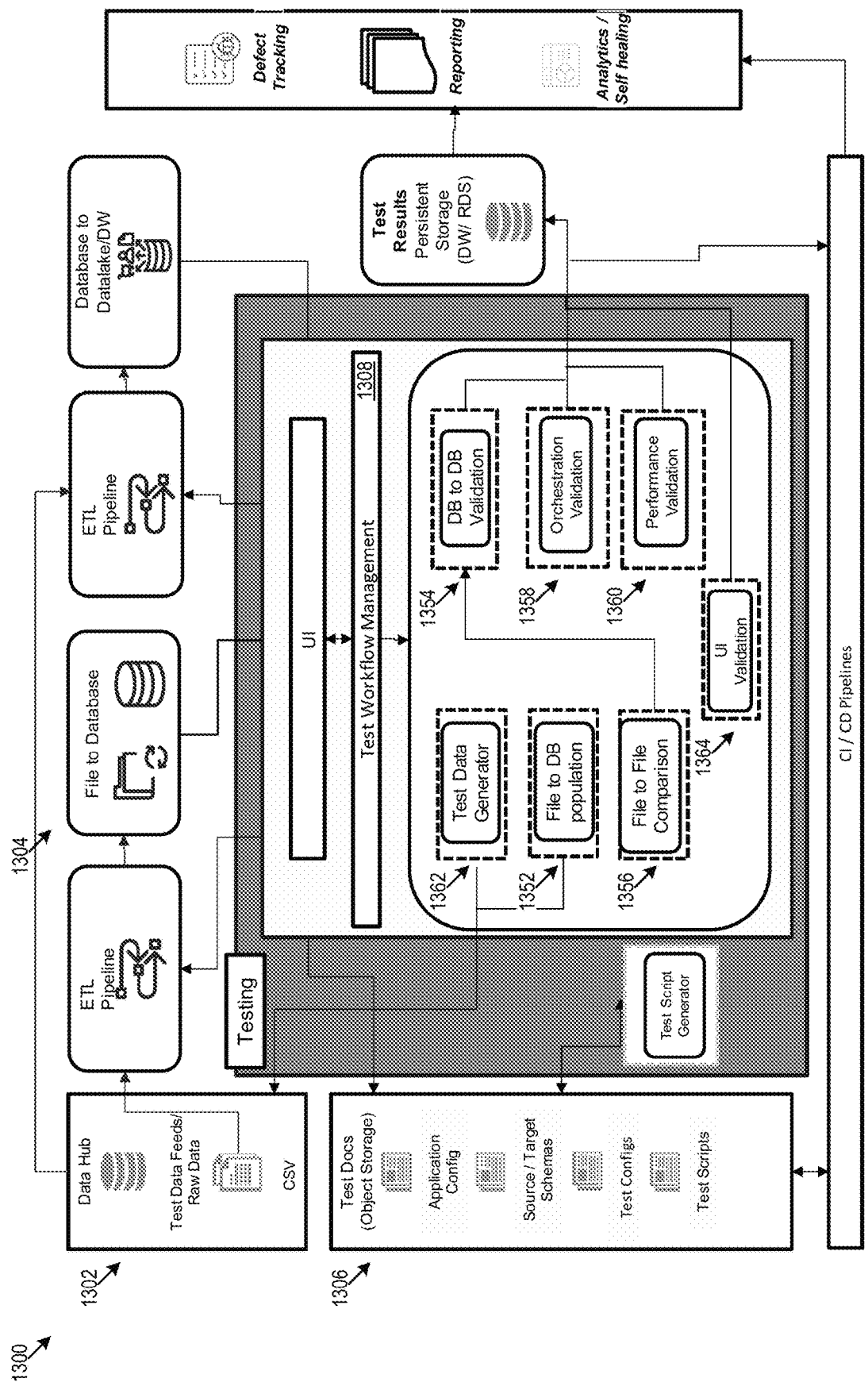
FIG. 13 shows a second example operational flow.

FIG. 13 shows a second example operational flow 1300 that may be used to coordinate operation of the DVL 200 and/or JVL 300. The migration data is obtained from the data sources 1302. The migration data is processed for intake via ETL tools 1304 (e.g., at the extraction tier). Test documents 1306 (which may include a master configuration file) may provide operational data for orchestration or other operational data. The testing may be performed under coordination by workflow management 1308 (e.g., as a portion of the DVL 200 and/or JVL 300). The testing may performed using various testing components. For example, a file to database (DB) population 1352 component may be used which enables data validation when the data source is a file and target is a database. For example, a DB to DB validation 1354 component may be used which enables data validation when the data source is a database and target is a database. For example, a file to file validation 1356 component may be used which enables data validation when the data source is a data file and target is a data file. File to DB 1352, DB to DB 1354, and File to File 1356 components may use the DVL 200 to coordinate data-agnostic validations of the data migration.

In various scenarios, the testing may include orchestration validation 1358, which may be governed by the JVL 300. Additionally or alternatively, performance validations 1360 and/or user interface (UI) validations 1364 may be implemented using the performance/UI controls of the DVL 200 and/or JVL 300. A test data generator 1362 may be used to generate synthetic data (which may be fed to the ETL tools 1304) for use in testing. Additionally or alternatively, the test data generator 1362 may be used to generate bad data to test validation sensitivity (e.g., the ability to detect data that should be denied validation).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible. Table 1 includes examples.

TABLE 1

| Examples |
|---|
| A1. A method including:<br>at network interface circuitry, receiving a migratory data stream;<br>using migration circuitry executing a pipelined multiple-tier test stack:<br>    at an extraction tier of the test stack:<br>        receiving an extraction trigger indicating reception of the migratory data<br>            stream; and<br>        responsive to the extraction trigger performing an extract-transform-load<br>            (ETL) operation on the migratory data stream to determine a selected<br>            application present among multiple applications in the migratory data<br>            stream;<br>    reverse-referencing an enabled-listing of a multi-point reference data model to<br>        determine whether the selected application is present;<br>    when the selected application is not present on the enabled-listing, causing a<br>        generation trigger responsive to the selected application;<br>    at a script generation tier of the test stack:<br>        responsive to the generation trigger, forward-referencing a script module<br>            of the multi-point reference data model to identify a test condition for the<br>            selected application;<br>        responsive to the test condition, generating a test script for the selected<br>            application; and<br>        generating a test trigger;<br>    at a test tier of the test stack, executing the test script responsive to the test<br>        trigger to generate a return of a specific data-type;<br>    causing a validation trigger responsive to execution of the test script;<br>    at a validation tier of the test stack:<br>        forward-referencing a validation module of the multi-point reference data<br>            model to identify a data-agnostic validation-grouping including the<br>            specific data-type;<br>        responsive to the validation trigger, executing a data-agnostic validation<br>            on the return to identify a validation condition, the data-agnostic<br>            validation assigned to the data-agnostic validation-grouping, the data-<br>            agnostic validation independent of a format specific to the specific<br>            data-type; and<br>        reverse-referencing the validation module of the multi-point reference<br>            data model to determine that the validation condition indicated a<br>            success for the data-agnostic validation; and<br>    responsive to the success, adding the selected application to the enabled-<br>        listing of the multi-point reference data model.<br>A2. The method of example A1 or any other example in this table, where the multi-<br>    point reference data model supports forward-referencing, reverse-referencing, or<br>    both at multiple points within the multi-point reference data model. |

TABLE 1-continued

Examples

A3. The method of example A2 or any other example in this table, where forward-referencing includes referencing the multi-point reference data model to determine an action to support advancement of validation.

A4. The method of example A2 or any other example in this table, where reverse-referencing includes referencing a current result to interpret a previous result.

A5. The method of example A1 or any other example in this table, where:
the test stack further includes a presentation tier; and
the method further includes generating an control interface configured to receive a
    selection of the multi-point reference data model;
      selection of a test script; or
      both.

A6. The method of example A1 or any other example in this table, where the data-agnostic validation is independent of a format specific to the specific data-type due a data generic analysis.

A7. The method of example A6 or any other example in this table, where the data generic analysis includes a source-target comparison analysis including a comparison of entries to factor out data type dependence.

A8. The method of example A6 or any other example in this table, where the data generic analysis includes a performance validation based on a performance metric for execution of the test script.

A9. The method of example A6 or any other example in this table, where the data generic analysis includes absence analysis including a determination of validity based on an absence of particular data in the specific data-type.

A10. A method including:
at network interface circuitry, receiving a job detail manifest;
using migration circuitry executing a pipelined multiple-tier test stack:
    at an extraction tier of the test stack:
        receiving a extraction trigger indicating reception of the job detail
          manifest; and
        responsive to the extraction trigger performing metadata extraction
          operation on the job detail manifest to determine a selected job
          placement present among multiple job placements in the job detail
          manifest;
    reverse-referencing an enabled-listing of a multi-point reference placement
      model to determine whether the selected job placement is present;
    when the selected job placement is not present on the enabled-listing, causing
      a generation trigger responsive to the selected job placement;
    at a script generation tier of the test stack:
        responsive to the generation trigger, forward-referencing a script module
          of the multi-point reference placement model to identify a test condition
          for the selected job placement;
        responsive to the test condition, generating a test script for the selected
          job placement; and
        generating a test trigger;
    at a test tier of the test stack, executing the test script responsive to the test
      trigger to generate a return of a specific placement;
    causing a validation trigger responsive to execution of the test script;
    at a validation tier of the test stack:
        forward-referencing a validation module of the multi-point reference
          placement model to identify a job-agnostic validation-grouping
          including the specific placement;
        responsive to the validation trigger, executing a job-agnostic validation
          on the return to identify a validation condition, the job-agnostic
          validation assigned to the job-agnostic validation-grouping, the job-
          agnostic validation independent of an actual schedule specific to the
          specific placement; and
        reverse-referencing the validation module of the multi-point reference
          placement model to determine that the validation condition indicated a
          success for the job-agnostic validation; and
    responsive to the success, adding the selected job placement to the enabled-
      listing of the multi-point reference placement model.

A11. The method of example A10 or any other example in this table, where the multi-point reference placement model supports forward-referencing, reverse-referencing, or both at multiple points within the multi-point reference placement model.

A12. The method of example A11 or any other example in this table, where forward-referencing includes referencing the multi-point reference placement model to determine an action to support advancement of validation.

A13. The method of example A11 or any other example in this table, where reverse-referencing includes referencing a current result to interpret a previous result.

A14. The method of example A10 or any other example in this table, where:
the test stack further includes a presentation tier; and
the method further includes generating an control interface configured to receive a
    selection of the multi-point reference placement model;
      selection of a test script; or
      both.

TABLE 1-continued

Examples

A15. The method of example A10 or any other example in this table, where the job-agnostic validation is independent of an execution context specific to the specific placement due a job generic analysis.

A16. The method of example A15 or any other example in this table, where the job generic analysis includes comparing a scheduled number of run times to an expected number of run times.

A17. The method of example A15 or any other example in this table, where the job generic analysis includes comparing identifiers for one or more scheduled runs.

A18. The method of example A15 or any other example in this table, where the job generic analysis includes a performance validation based on a performance metric for execution of the test script.

A19. A product including:
machine-readable media other than a transitory signal;
instructions stored on the machine-readable media configured to, when executed, cause a machine to:
    at network interface circuitry, receive a migratory data stream;
    using migration circuitry execute a pipelined multiple-tier test stack:
        at an extraction tier of the test stack:
            receive an extraction trigger indicating reception of the migratory data stream; and
            responsive to the extraction trigger perform an extract-transform-load (ETL) operation on the migratory data stream to determine a selected application present among multiple applications in the migratory data stream;
        reverse-reference an enabled-listing of a multi-point reference data model to determine whether the selected application is present;
        when the selected application is not present on the enabled-listing, cause a generation trigger responsive to the selected application;
        at a script generation tier of the test stack:
            responsive to the generation trigger, forward-reference a script module of the multi-point reference data model to identify a test condition for the selected application;
            responsive to the test condition, generate a test script for the selected application; and
            generate a test trigger;
        at a test tier of the test stack, execute the test script responsive to the test trigger to generate a return of a specific data-type;
        cause a validation trigger responsive to execution of the test script;
        at a validation tier of the test stack:
            forward-reference a validation module of the multi-point reference data model to identify a data-agnostic validation-grouping including the specific data-type;
            responsive to the validation trigger, execute a data-agnostic validation on the return to identify a validation condition, the data-agnostic validation assigned to the data-agnostic validation-grouping, the data-agnostic validation independent of a format specific to the specific data-type; and
            reverse-reference the validation module of the multi-point reference data model to determine that the validation condition indicated a success for the data-agnostic validation; and
        responsive to the success, add the selected application to the enabled-listing of the multi-point reference data model.

A20. The product of example A19 or any other example in this table, where the multi-point reference data model is configured to support forward-reference, reverse-reference, or both at multiple points within the multi-point reference data model.

B1. A method including:
at network interface circuitry, receiving a migratory data stream;
using migration circuitry executing a pipelined multiple-tier test stack:
    at an extraction tier of the test stack:
        receiving an extraction trigger indicating reception of the migratory data stream; and
        responsive to the trigger performing an extract-transform-load (ETL) operation on the migratory data stream to determine a selected application present among multiple applications in the migratory data stream;
    reverse-referencing an enabled-listing of a multi-point reference data model to determine whether the selected application is present;
    when the selected application is not present on the enabled-listing, causing a generation trigger responsive to the selected application;
    at a script generation tier of the test stack:
        responsive to the generation trigger, forward-referencing a script module of the multi-point reference data model to identify a test condition for the selected application;
        responsive to the test condition, generating a test script for the selected application; and
        generating a test trigger;

TABLE 1-continued

Examples at a test tier of the test stack, executing the test script responsive to the test
trigger to generate a return of a specific data-type;
causing a validation trigger responsive to execution of the test script;
at a validation tier of the test stack:
    forward-referencing a validation module of the multi-point reference data
       model to identify a data-agnostic validation-grouping including the
       specific data-type;
    responsive to the validation trigger, executing a data-agnostic validation
       on the return to identify a validation condition, the data-agnostic
       assigned to the data-agnostic validation-grouping, the data-agnostic
       validation independent of a format specific to the specific data-type;
       and
    reverse referencing the validation module of the multi-point reference
       data model to determine that the validation condition indicated a
       success for the data-agnostic validation; and
responsive to the success, adding the selected application to the enabled-
listing of the multi-point reference data model.

B2. The method of example B1 or any other example in this table, where the multi-point reference data model supports forward-referencing and/or reverse-referencing at multiple points within the multi-point reference data model, where:
forward-referencing includes referencing the multi-point reference data model to determine an action, data item, operation, or other entry to support advancement of testing and/or validation;
reverse-referencing includes referencing a result (or model result) to interpret a previous result or outcome of an action taken by the migration circuitry, where:
optionally, forward-referencing and/or reverse-referencing allows for forward operation and/or back-tracing of the operation of the migration circuitry.

B3. The method of any of the examples in this table, where the execution of the test stack on the migration circuitry is governed by migration logic.

B4. The method of any of the examples in this table, where the test stack includes one or more additional tiers, where, optionally, the one or more additional tiers include status checks for test operations and/or validation operations.

B5. The method of example 4 or any of the examples in this table, where the one or more additional tiers include a presentation tier that supports generation of interface elements for operator control and/or monitoring.

B6. The method of any of the examples in this table, where the data-agnostic validation is independent of a format specific to the specific data-type due a data generic analysis, where:
    optionally, the data generic analysis includes a source-target comparison
       analysis that compares entries to factor out data type dependence;
    optionally, the data generic analysis includes a presence analysis that
       determines validity based on a presence of particular data in the result;
    optionally, the data generic analysis includes an absence analysis that
       determines validity based on an absence of particular data in the result;
    optionally, the data generic analysis includes an fetch analysis that determines
       validity based on an whether a data fetch operation occurred;
    optionally, the data generic analysis includes a fetch analysis that determines
       validity based on an whether a data fetch operation occurred;
    optionally, the data generic analysis includes dimension change analysis that
       determines validity based on a slowly changing dimension analysis.

B7. A system including circuitry configured to implement the method of any of the examples in this table, where:
    optionally, the circuitry is included within a mobile device;
    optionally, the circuitry is included within computing hardware (localized,
       distributed, virtualized, serverless, and/or other computing platform).

B8. A product including:
machine-readable media; and
instructions stored on the machine-readable media, the instructions configured to cause a machine to execute the method of any of the examples in this table, where:
    optionally, the machine-readable media is non-transitory;
    optionally, the machine-readable media is other than a transitory signal; and
    optionally, the instructions are executable.

B9. A method including implementing any of or any combination of the features described in the disclosure.

B10. A system including circuitry configured to implement any of or any combination of the features described in the disclosure.

B11. A product including:
machine-readable media; and
instructions stored on the machine-readable media, the instructions configured to cause a machine to implement any of or any combination of the features described in the disclosure, where:
    optionally, the machine-readable media is non-transitory;
    optionally, the machine-readable media is other than a transitory signal; and
    optionally, the instructions are executable.

What is claimed is:

1. A method including:
at network interface circuitry, receiving a migratory data stream;
using migration circuitry executing a pipelined multiple-tier test stack:
at an extraction tier of the test stack:
receiving an extraction trigger indicating reception of the migratory data stream; and
responsive to the extraction trigger performing an extract-transform-load (ETL) operation on the migratory data stream to determine a selected application present among multiple applications in the migratory data stream;
reverse-referencing an enabled-listing of a multi-point reference data model to determine whether the selected application is present;
when the selected application is not present on the enabled-listing, causing a generation trigger responsive to the selected application;
at a script generation tier of the test stack:
responsive to the generation trigger, forward-referencing a script module of the multi-point reference data model to identify a test condition for the selected application;
responsive to the test condition, generating a test script for the selected application; and
generating a test trigger;
at a test tier of the test stack, executing the test script responsive to the test trigger to generate a return of a specific data-type;
causing a validation trigger responsive to execution of the test script;
at a validation tier of the test stack:
forward-referencing a validation module of the multi-point reference data model to identify a data-agnostic validation-grouping including the specific data-type;
responsive to the validation trigger, executing a data-agnostic validation on the return to identify a validation condition, the data-agnostic validation assigned to the data-agnostic validation-grouping, the data-agnostic validation independent of a format specific to the specific data-type; and
reverse-referencing the validation module of the multi-point reference data model to determine that the validation condition indicated a success for the data-agnostic validation; and
responsive to the success, adding the selected application to the enabled-listing of the multi-point reference data model.

2. The method of claim 1, where the multi-point reference data model supports forward-referencing, reverse-referencing, or both at multiple points within the multi-point reference data model.

3. The method of claim 2, where forward-referencing includes referencing the multi-point reference data model to determine an action to support advancement of validation.

4. The method of claim 2, where reverse-referencing includes referencing a current result to interpret a previous result.

5. The method of claim 1, where:
the test stack further includes a presentation tier; and
the method further includes generating a control interface configured to receive a selection of the multi-point reference data model;
selection of a test script; or
both.

6. The method of claim 1, where the data-agnostic validation is independent of a format specific to the specific data-type due a data generic analysis.

7. The method of claim 6, where the data generic analysis includes a source-target comparison analysis including a comparison of entries to factor out data type dependence.

8. The method of claim 6, where the data generic analysis includes a performance validation based on a performance metric for execution of the test script.

9. The method of claim 6, where the data generic analysis includes absence analysis including a determination of validity based on an absence of particular data in the specific data-type.

10. A method including:
at network interface circuitry, receiving a job detail manifest;
using migration circuitry executing a pipelined multiple-tier test stack:
at an extraction tier of the test stack:
receiving a extraction trigger indicating reception of the job detail manifest; and
responsive to the extraction trigger performing metadata extraction operation on the job detail manifest to determine a selected job placement present among multiple job placements in the job detail manifest;
reverse-referencing an enabled-listing of a multi-point reference placement model to determine whether the selected job placement is present;
when the selected job placement is not present on the enabled-listing, causing a generation trigger responsive to the selected job placement;
at a script generation tier of the test stack:
responsive to the generation trigger, forward-referencing a script module of the multi-point reference placement model to identify a test condition for the selected job placement;
responsive to the test condition, generating a test script for the selected job placement; and
generating a test trigger;
at a test tier of the test stack, executing the test script responsive to the test trigger to generate a return of a specific placement;
causing a validation trigger responsive to execution of the test script;
at a validation tier of the test stack:
forward-referencing a validation module of the multi-point reference placement model to identify a job-agnostic validation-grouping including the specific placement;
responsive to the validation trigger, executing a job-agnostic validation on the return to identify a validation condition, the job-agnostic validation assigned to the job-agnostic validation-grouping, the job-agnostic validation independent of an actual schedule specific to the specific placement; and
reverse-referencing the validation module of the multi-point reference placement model to determine that the validation condition indicated a success for the job-agnostic validation; and responsive to the success, adding the selected job placement to the enabled-listing of the multi-point reference placement model.

11. The method of claim 10, where the multi-point reference placement model supports forward-referencing, reverse-referencing, or both at multiple points within the multi-point reference placement model.

12. The method of claim 11, where forward-referencing includes referencing the multi-point reference placement model to determine an action to support advancement of validation.

13. The method of claim 11, where reverse-referencing includes referencing a current result to interpret a previous result.

14. The method of claim 10, where:
the test stack further includes a presentation tier; and
the method further includes generating a control interface configured to receive a selection of the multi-point reference placement model;
  selection of a test script; or
  both.

15. The method of claim 10, where the job-agnostic validation is independent of an execution context specific to the specific placement due a job generic analysis.

16. The method of claim 15, where the job generic analysis includes comparing a scheduled number of run times to an expected number of run times.

17. The method of claim 15, where the job generic analysis includes comparing identifiers for one or more scheduled runs.

18. The method of claim 15, where the job generic analysis includes a performance validation based on a performance metric for execution of the test script.

19. A product including:
machine-readable media other than a transitory signal;
instructions stored on the machine-readable media configured to, when executed, cause a machine to:
  at network interface circuitry, receive a migratory data stream;
  using migration circuitry execute a pipelined multiple-tier test stack:
    at an extraction tier of the test stack:
      receive an extraction trigger indicating reception of the migratory data stream; and
      responsive to the extraction trigger perform an extract-transform-load (ETL) operation on the migratory data stream to determine a selected application present among multiple applications in the migratory data stream;
    reverse-reference an enabled-listing of a multi-point reference data model to determine whether the selected application is present;
    when the selected application is not present on the enabled-listing, cause a generation trigger responsive to the selected application;
    at a script generation tier of the test stack:
      responsive to the generation trigger, forward-reference a script module of the multi-point reference data model to identify a test condition for the selected application;
      responsive to the test condition, generate a test script for the selected application; and
      generate a test trigger;
    at a test tier of the test stack, execute the test script responsive to the test trigger to generate a return of a specific data-type;
    cause a validation trigger responsive to execution of the test script;
    at a validation tier of the test stack:
      forward-reference a validation module of the multi-point reference data model to identify a data-agnostic validation-grouping including the specific data-type;
      responsive to the validation trigger, execute a data-agnostic validation on the return to identify a validation condition, the data-agnostic validation assigned to the data-agnostic validation-grouping, the data-agnostic validation independent of a format specific to the specific data-type; and
      reverse-reference the validation module of the multi-point reference data model to determine that the validation condition indicated a success for the data-agnostic validation; and
    responsive to the success, add the selected application to the enabled-listing of the multi-point reference data model.

20. The product of claim 19, where the multi-point reference data model is configured to support forward-reference, reverse-reference, or both at multiple points within the multi-point reference data model.

* * * * *